(12) United States Patent
He et al.

(10) Patent No.: US 10,298,355 B2
(45) Date of Patent: May 21, 2019

(54) SUPPORTING COOPERATIVE TRANSMISSION IN MASSIVE MULTIPLE-INPUT MULTIPLE-OUTPUT (MIMO) SYSTEMS

(71) Applicant: Corning Incorporated, Corning, NY (US)

(72) Inventors: Chao He, Allen, TX (US); Anthony Ng'Oma, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/692,771

(22) Filed: Aug. 31, 2017

(65) Prior Publication Data

US 2018/0248639 A1    Aug. 30, 2018

Related U.S. Application Data

(60) Provisional application No. 62/464,751, filed on Feb. 28, 2017.

(51) Int. Cl.
  *H04J 11/00* (2006.01)
  *H04B 7/06* (2006.01)
  (Continued)

(52) U.S. Cl.
  CPC ............ *H04J 11/0053* (2013.01); *H01Q 1/22* (2013.01); *H04B 7/024* (2013.01); *H04B 7/0617* (2013.01);
  (Continued)

(58) Field of Classification Search
  CPC ..... H04B 7/024; H04B 7/0626; H04J 11/0053
  See application file for complete search history.

(56) References Cited

U.S. PATENT DOCUMENTS

| 10,051,588 B2* | 8/2018 | Wang ................. H04W 56/001 |
| 2008/0025433 A1* | 1/2008 | Deguchi ............... H04L 5/0016 375/295 |

(Continued)

FOREIGN PATENT DOCUMENTS

| CN | 104579443 A | 4/2015 |
| WO | 2014074919 A1 | 5/2014 |
| WO | 2015183791 A1 | 12/2015 |

OTHER PUBLICATIONS

International Search Report and Written Opinion PCT/US2018/018609 dated Jun. 21, 2018.

(Continued)

*Primary Examiner* — Devan A Sandiford
(74) *Attorney, Agent, or Firm* — C. Keith Montgomery

(57) ABSTRACT

Embodiments of the disclosure relate to supporting cooperative transmission in massive multiple-input multiple-output (MIMO) systems, such as a wireless distribution system (WDS). A WDS includes a plurality of remote units each defining a home coverage cell. A selected remote unit can coordinate with a neighboring remote unit(s) to help mitigate inter-cell interference for a selected client device(s) located in an overlapping coverage area between the home coverage cell of the selected remote unit and a neighboring coverage cell(s) defined by the neighboring remote unit(s). The selected remote unit receives channel-data information from the selected client device(s) and forms a first radio frequency (RF) beam based on the channel-data information to distribute a downlink signal(s) to the selected client device. The selected remote unit coordinates with the neighboring remote unit(s) based on the channel-data information to form a second RF beam to distribute the downlink signal(s) to the selected client device.

20 Claims, 10 Drawing Sheets

(51) Int. Cl.

| | | |
|---|---|---|
| *H04B 7/024* | (2017.01) | |
| *H04L 1/18* | (2006.01) | |
| *H01Q 1/22* | (2006.01) | |
| *H04B 10/2575* | (2013.01) | |
| *H04W 16/20* | (2009.01) | |
| *H04W 84/12* | (2009.01) | |
| *H04W 88/08* | (2009.01) | |
| *H04B 7/0452* | (2017.01) | |
| *H04L 27/26* | (2006.01) | |
| *H04W 36/00* | (2009.01) | |
| *H04W 72/08* | (2009.01) | |

(52) U.S. Cl.
CPC ......... *H04B 7/0626* (2013.01); *H04B 7/0632* (2013.01); *H04B 7/0639* (2013.01); *H04B 7/0686* (2013.01); *H04B 10/25754* (2013.01); *H04B 10/25759* (2013.01); *H04L 1/1816* (2013.01); *H04W 16/20* (2013.01); *H04W 84/12* (2013.01); *H04W 88/085* (2013.01); *H04B 7/0452* (2013.01); *H04L 27/2626* (2013.01); *H04W 36/0061* (2013.01); *H04W 72/082* (2013.01)

(56) References Cited

U.S. PATENT DOCUMENTS

| | | | | |
|---|---|---|---|---|
| 2008/0159436 A1* | 7/2008 | Cho | ............ | H04L 1/0061 375/299 |
| 2009/0117911 A1* | 5/2009 | Molisch | ............ | H04B 7/0678 455/450 |
| 2010/0081448 A1* | 4/2010 | Wong | ............ | H04W 72/121 455/452.1 |
| 2011/0299617 A1* | 12/2011 | Maddah-Ali | ............ | H04B 7/024 375/267 |
| 2012/0113883 A1* | 5/2012 | Osterling | ............ | H04B 7/024 370/312 |
| 2012/0257574 A1* | 10/2012 | Seok | ............ | H04W 72/082 370/328 |
| 2012/0281554 A1* | 11/2012 | Gao | ............ | H04W 48/12 370/252 |
| 2012/0281781 A1* | 11/2012 | Xiao | ............ | H04B 7/024 375/267 |
| 2013/0176887 A1* | 7/2013 | Seo | ............ | H04B 7/024 370/252 |
| 2013/0308590 A1* | 11/2013 | Ihm | ............ | H04B 7/0632 370/329 |
| 2013/0310098 A1* | 11/2013 | Baligh | ............ | H04L 5/0032 455/509 |
| 2013/0322415 A1* | 12/2013 | Chamarti | ............ | G01S 5/0231 370/338 |
| 2014/0140235 A1* | 5/2014 | Park | ............ | H04W 52/244 370/252 |
| 2014/0233442 A1* | 8/2014 | Atias | ............ | H04W 52/0206 370/311 |

OTHER PUBLICATIONS

Hosseini, K.; Wei Yu; Adve, R.S. "Large-Scale MIMO Versus Network MIMO for Multicell Interference Mitgation", Selected Topics in Signal Processing, IEEE Journal of, On pp. 930-941 vol. 8, Issue: 5, Oct. 2014.

* cited by examiner

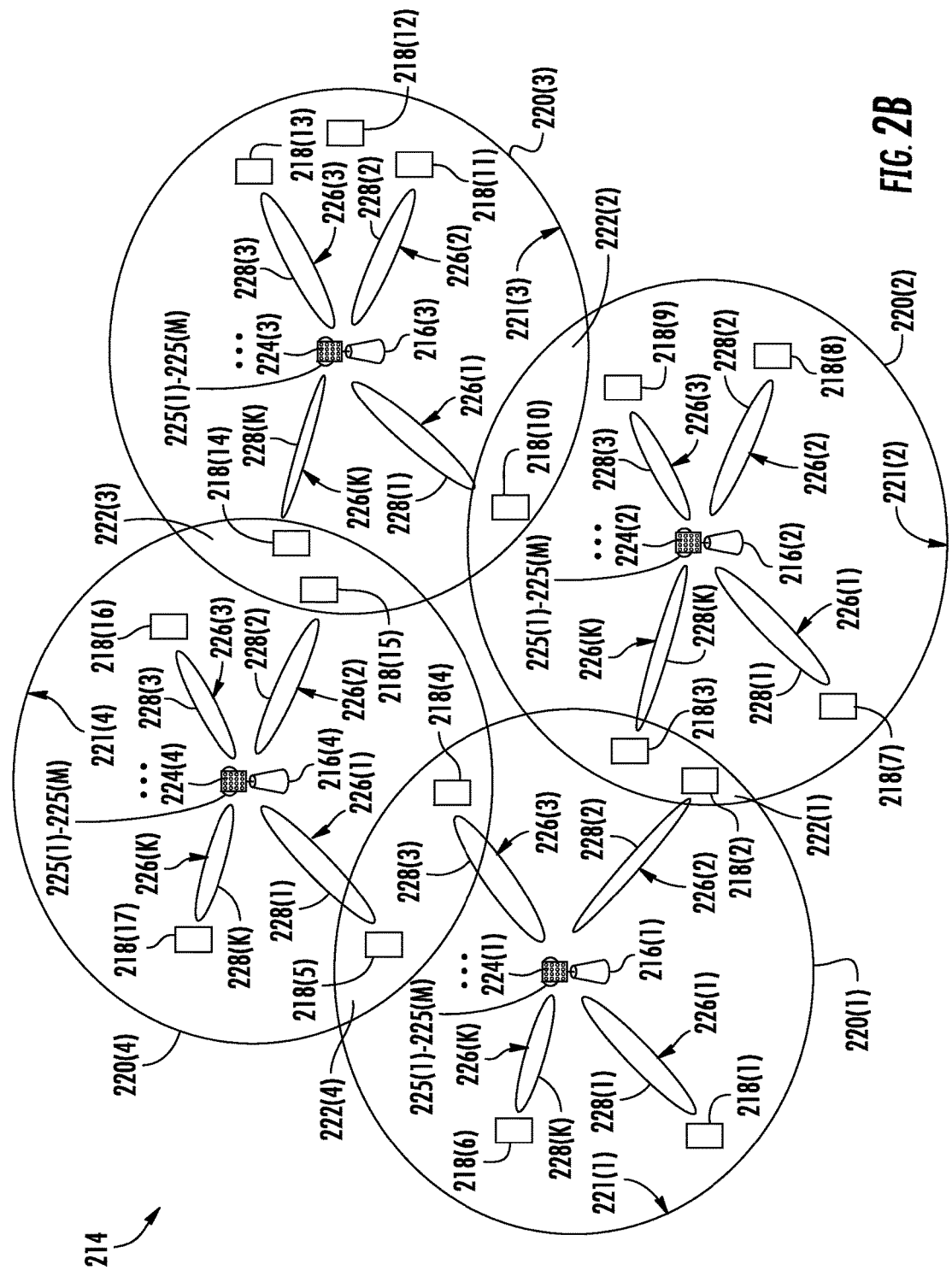

SUPPORTING COOPERATIVE TRANSMISSION IN MASSIVE MULTIPLE-INPUT MULTIPLE-OUTPUT (MIMO) SYSTEMS

CROSS-REFERENCE TO RELATED APPLICATIONS

This application claims the benefit of priority under 35 U.S.C. § 119(e) of U.S. Provisional Application Ser. No. 62/464,751 filed on Feb. 28, 2017, the content of which is relied upon and incorporated herein by reference in its entirety.

BACKGROUND

The disclosure relates generally to supporting cooperative transmission in a massive multiple-input multiple-output (MIMO) system, such as a wireless distribution system (WDS).

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of DASs. DASs include remote units configured to receive and transmit communications signals to client devices within an antenna range of the remote units. DASs can be particularly useful when deployed inside buildings or other indoor environments where the wireless communications devices may not otherwise be able to effectively receive RF signals from a source.

In this regard, FIG. 1 illustrates a distribution of communications services to coverage cells 100(1)-100(N) of a WDS provided in the form of a DAS 102, wherein 'N' is the number of coverage cells. These communications services can include cellular services, wireless services, such RF identification (RFID) tracking, Wireless Fidelity (Wi-Fi), local area network (LAN), and wireless LAN (WLAN), wireless solutions (Bluetooth, Wi-Fi Global Positioning System (GPS), signal-based, and others) for location-based services, and combinations thereof, as examples. The coverage cells 100(1)-100(N) may be remotely located. In this regard, the coverage cells 100(1)-100(N) are created by and centered on remote units 104(1)-104(N) connected to a central unit 106 (e.g., a head-end equipment, a head-end controller, or a head-end unit). The central unit 106 may be communicatively coupled to a signal source 108, for example, a base transceiver station (BTS) or a baseband unit (BBU). In this regard, the central unit 106 receives downlink communications signals 110D from the signal source 108 to be distributed to the remote units 104(1)-104(N). The remote units 104(1)-104(N) are configured to receive the downlink communications signals 110D from the central unit 106 over a communications medium 112 to be distributed to the respective coverage cells 100(1)-100(N) of the remote units 104(1)-104(N). Each of the remote units 104(1)-104(N) may include an RF transmitter/receiver and a respective antenna 114(1)-114(N) operably connected to the RF transmitter/receiver to wirelessly distribute the communications services to client devices 116 within the respective coverage cells 100(1)-100(N). The remote units 104(1)-104(N) are also configured to receive uplink communications signals 110U from the client devices 116 in the respective coverage cells 100(1)-100(N) to be distributed to the signal source 108. The size of each of the coverage cells 100(1)-100(N) is determined by the amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective coverage cells 100(1)-100(N).

The DAS 102 and the coverage cells 100(1)-100(N) can be configured to function as a massive MIMO system, in which the coverage cells 100(1)-100(N) each form a respective micro coverage cell. The remote units 104(1)-104(N) in the coverage cells 100(1)-100(N) may be provided as low-power remote radio heads (RRHs) to distribute the downlink communications signals 110D and/or receive the uplink communications signals 110U using the same RF spectrum (e.g., RF band/channel). In this regard, it may be possible to adapt the DAS 102 to support the next generation (e.g., fifth-generation (5G)) wireless communications systems.

No admission is made that any reference cited herein constitutes prior art. Applicant expressly reserves the right to challenge the accuracy and pertinency of any cited documents.

SUMMARY

Embodiments of the disclosure relate to supporting cooperative transmission in massive multiple-input multiple-output (MIMO) systems, such as a wireless distribution system (WDS). A WDS includes a plurality of remote units, which may provide similar wireless communications services functionality to remote radio heads (RRHs) in the massive MIMO system. The remote units in the WDS each define a respective home coverage cell among a plurality of coverage cells in the WDS. In examples disclosed herein, a selected remote unit in the WDS is configured to coordinate with a neighboring remote unit(s) to mitigate inter-cell interference for a selected client device(s) located in an overlapping coverage area between the home coverage cell of the selected remote unit and a neighboring coverage cell(s) defined by the neighboring remote unit(s). Specifically, the selected remote unit receives channel-data information from the selected client device(s) and forms a first radio frequency (RF) beam based on the channel-data information to distribute a downlink signal(s) to the selected client device. In addition, the selected remote unit coordinates with the neighboring remote unit(s) based on the channel-data information to form a second RF beam to distribute the downlink signal(s) from the neighboring remote unit to the selected client device. By distributing the downlink signal(s) to the selected client device in the first RF beam and the second RF beam (e.g., simultaneously), it is possible to improve signal to interference and noise ratio (SINR) of the downlink signal(s) received by the selected client device, thus mitigating inter-cell interference for the selected client device. Further, by forming the first RF beam and the second RF beam based on the channel-data information received from the selected client device, it is also possible to reduce processing overhead and complexity associated with coordinated scheduling (CS) and/or coordinated beamforming (CB), thus helping to improve robustness and performance of the WDS.

In this regard, in one aspect, a WDS is provided. The WDS includes a plurality of remote units each configured to define a home coverage cell among a plurality of coverage cells in the WDS to communicate one or more downlink signals to one or more client devices located within a boundary of the home coverage cell. A selected remote unit among the plurality of remote units is configured to identify at least one selected client device located in at least one overlapping coverage area between the home coverage cell of the selected remote unit and at least one neighboring coverage cell defined by at least one neighboring remote unit among the plurality of remote units. The selected remote unit is also configured to receive channel-data information from the at least one selected client device. The selected remote unit is also configured to form a first RF beam based on the channel-data information to distribute at least one first downlink signal among the one or more downlink signals to the at least one selected client device. The selected remote unit is also configured to coordinate with the at least one neighboring remote unit based on the channel-data information to form at least one second RF beam to distribute the at least one first downlink signal from the at least one neighboring remote unit to the at least one selected client device.

In another aspect, a method for supporting cooperative transmissions among a plurality of remote units in a WDS is provided. The method includes identifying at least one selected client device located in at least one overlapping coverage area between a home coverage cell of a selected remote unit among the plurality of remote units and at least one neighboring coverage cell defined by at least one neighboring remote unit among the plurality of remote units. The method also includes receiving channel-data information from the at least one selected client device. The method also includes forming a first RF beam based on the channel-data information to distribute at least one first downlink signal to the at least one selected client device. The method also includes coordinating with the at least one neighboring remote unit based on the channel-data information to form at least one second RF beam to distribute the at least one first downlink signal from the at least one neighboring remote unit to the at least one selected client device.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiments, and together with the description serve to explain principles and operation of the various embodiments.

BRIEF DESCRIPTION OF THE DRAWINGS

FIG. 2B is a schematic diagram of an exemplary conventional network MIMO system in which a plurality of RRHs is configured to support MU-MIMO communications with a plurality of client devices in a plurality of coverage cells;

DETAILED DESCRIPTION

Embodiments of the disclosure relate to supporting cooperative transmission in massive multiple-input multiple-output (MIMO) systems, such as a wireless distribution system (WDS). A WDS includes a plurality of remote units, which may provide similar wireless communications services functionality to remote radio heads (RRHs) in the massive MIMO system. The remote units in the WDS each define a respective home coverage cell among a plurality of coverage cells in the WDS. In examples disclosed herein, a selected remote unit in the WDS is configured to coordinate with a neighboring remote unit(s) to mitigate inter-cell interference for a selected client device(s) located in an overlapping coverage area between the home coverage cell of the selected remote unit and a neighboring coverage cell(s) defined by the neighboring remote unit(s). Specifically, the selected remote unit receives channel-data information from the selected client device(s) and forms a first radio frequency (RF) beam based on the channel-data information to distribute a downlink signal(s) to the selected client device. In addition, the selected remote unit coordinates with the neighboring remote unit(s) based on the channel-data information to form a second RF beam to distribute the downlink signal(s) from the neighboring remote unit to the selected client device. By distributing the downlink signal(s) to the selected client device in the first RF beam and the second RF beam (e.g., simultaneously), it is possible to improve signal to interference and noise ratio (SINR) of the downlink signal(s) received by the selected client device, thus mitigating inter-cell interference for the selected client device. Further, by forming the first RF beam and the second RF beam based on the channel-data information received from the selected client device, it is also possible to reduce processing overhead and complexity associated with coordinated scheduling (CS) and/or coordinated beamforming (CB), thus helping to improve robustness and performance of the WDS.

Figure 1:
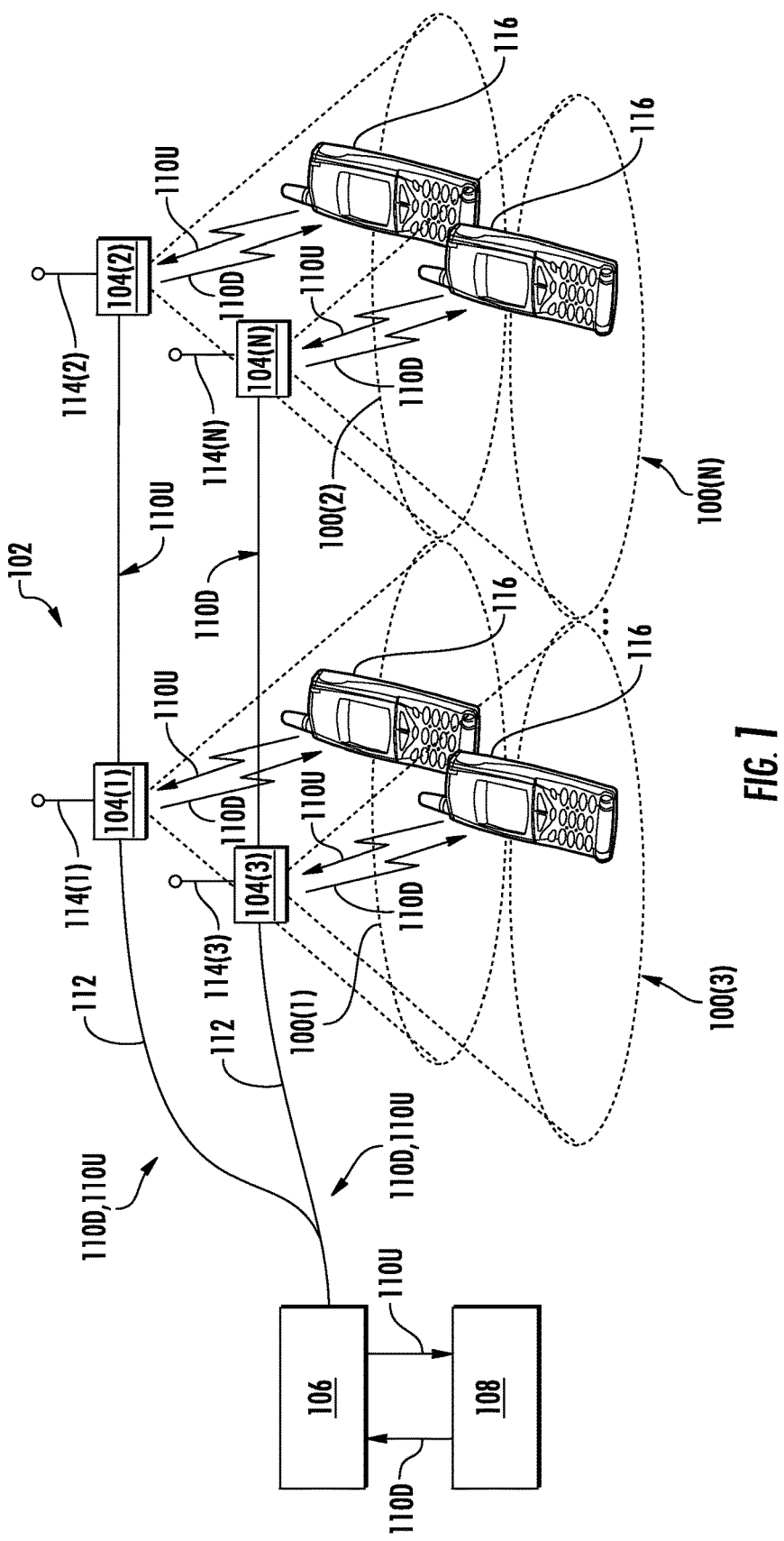
FIG. 1 is a schematic diagram of an exemplary wireless distribution system (WDS), which may be a distributed antenna system (DAS) for example.
Figure 2A:
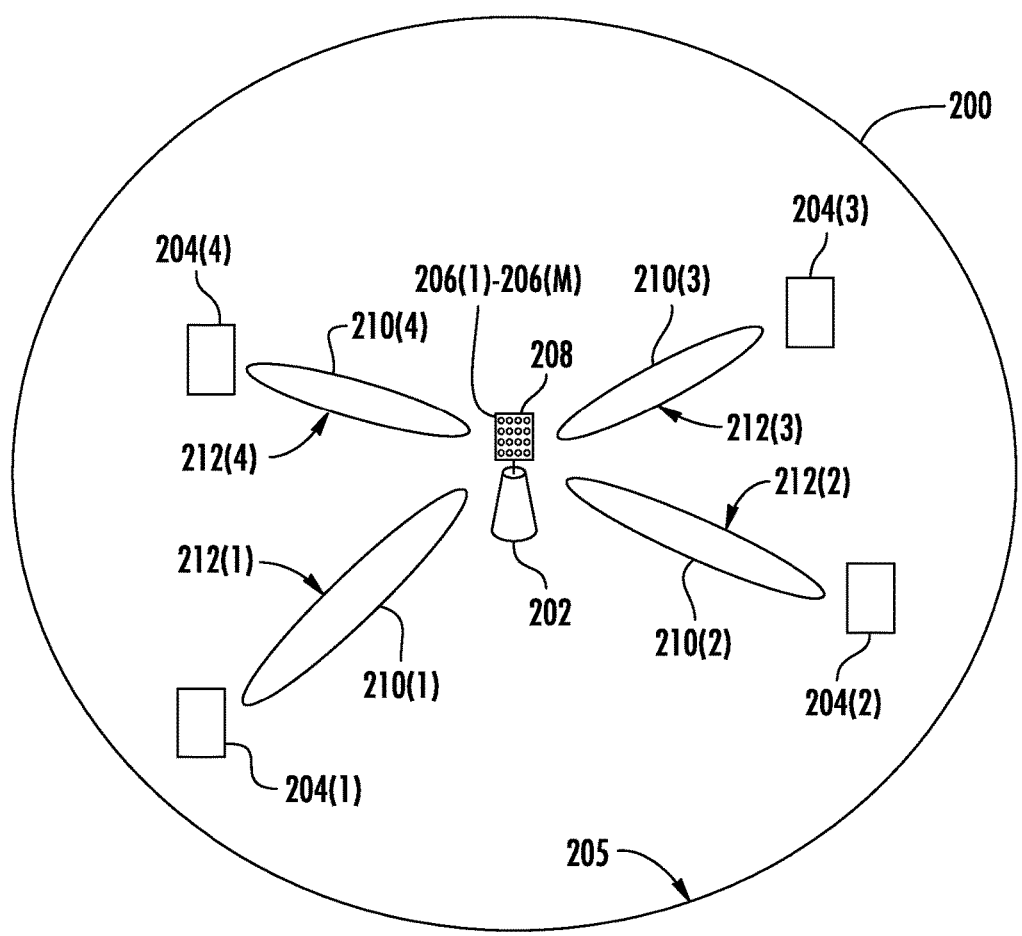
FIG. 2A is a schematic diagram of an exemplary multi-user multiple-input multiple-output (MU-MIMO) coverage cell in which a remote radio head (RRH) is configured to support MU-MIMO communications with a plurality of client devices.

Before discussing exemplary aspects of cooperative transmission methods in massive MIMO systems, a brief overview of a multi-user (MU) MIMO (MU-MIMO) coverage cell and a conventional network MIMO system including multiple MU-MIMO coverage cells is first provided with reference to FIGS. 2A and 2B, respectively. The discussion of specific exemplary aspects of cooperative transmission methods in massive MIMO systems starts below with reference to FIG. 3.

In this regard, FIG. 2A is a schematic diagram of an exemplary MU-MIMO coverage cell 200 in which an RRH 202 is configured to support MU-MIMO communications with a plurality of client devices 204(1)-204(4). In a non-limiting example, the RRH 202 is a low power radio transceiver located remotely from a central radio transceiver (e.g., base station, evolved Node-B, etc.) for communicating downlink and uplink RF signals in a respective coverage cell such as the MU-MIMO coverage cell 200. The MU-MIMO coverage cell 200 is defined by a cell boundary 205, which may be a perimeter at a determined distance (e.g., radius) from the RRH 202. Although the MU-MIMO coverage cell 200 is shown to include only the client devices 204(1)-204(4), it should be appreciated that the MU-MIMO coverage cell 200 can include more than the client devices 204(1)-204(4) as shown in FIG. 2A.

The RRH 202 includes a plurality of antennas 206(1)-206(M) provided in an antenna array 208. As such, the RRH 202 is able to form a plurality of RF beams 210(1)-210(4) for communicating a plurality of wireless communications signals 212(1)-212(4) with the client devices 204(1)-204(4), respectively.

To achieve higher spectral efficiency, the RRH 202 is configured to (e.g., simultaneously) communicate the wireless communications signals 212(1)-212(4) to the client devices 204(1)-204(4) based on the same time-frequency resource, which includes RF carriers in a frequency domain and symbol streams in a time domain. A broadband wireless system, such as long-term evolution (LTE) for example, uses frequency and time to spread data in the wireless communications signals 212(1)-212(4), providing high speeds and greater signal reliability. For each subcarrier, the data in the wireless communications signals 212(1)-212(4) is sent in continuous symbols, each representing a defined duration in time. As such, intra-cell interference, such as co-channel interference (CCI), may occur between the RF beams 210(1)-210(4), thus causing severe degradation in the wireless communications signals 212(1)-212(4). In this regard, it may be desired that the RRH 202 perform control and/or coordination measures to mitigate the intra-cell interference between the RF beams 210(1)-210(4). For example, the RRH 202 can be configured to pre-code respective symbol streams for each of the wireless communications signals 212(1)-212(4) and/or control the respective RF power in each of the RF beams 210(1)-210(4) to help suppress the CCI and improve the SINR for each of the wireless communications signals 212(1)-212(4).

A number of the MU-MIMO coverage cells, such as the MU-MIMO coverage cell 200, can be included in a large-scale system to form a network MIMO system for providing wireless communications services in an indoor and/or outdoor environment. In this regard, FIG. 2B is a schematic diagram of an exemplary conventional network MIMO system 214 in which a plurality of RRHs 216(1)-216(4) is configured to support MU-MIMO communications with a plurality of client devices 218(1)-218(17) in a plurality of coverage cells 220(1)-220(4). The coverage cells 220(1)-220(4) are defined by a plurality of cell boundaries 221(1)-221(4), respectively. In this network MIMO system, each of the RRHs 216(1)-216(4) is functionally equivalent to the RRH 202 in FIG. 2A.

Although the conventional network MIMO system 214 is shown to include only the RRHs 216(1)-216(4) and the coverage cells 220(1)-220(4), it should be appreciated that the conventional network MIMO system 214 can include more than the RRHs 216(1)-216(4) and more than the coverage cells 220(1)-220(4). In addition, it should be appreciated that the conventional network MIMO system 214 can also include more than the client devices 218(1)-218(17) as shown in FIG. 2B. Notably, a practical network MIMO system may include dozens of RRHs and hundreds of client devices. As such, the RRHs 216(1)-216(4), the coverage cells 220(1)-220(4), and the client devices 218(1)-218(17) are discussed herein as non-limiting examples.

Each of the RRHs 216(1)-216(4) is configured to function as the RRH 202 of FIG. 2A to support MU-MIMO communications in a home coverage cell among the coverage cells 220(1)-220(4). In examples discussed hereinafter, a coverage cell is referred to as a home coverage cell to an RRH if the coverage cell is identified by a corresponding identification of the RRH. In contrast, a coverage cell not identified by the corresponding identification of the RRH, but which overlaps at least partially with the home coverage cell identified by the RRH, can be referred to as a neighboring coverage cell. In this regard, the coverage cell 220(1) is the home coverage cell served by the RRH 216(1), the coverage cell 220(2) is the home coverage cell served by the RRH 216(2), the coverage cell 220(3) is the home coverage cell served by the RRH 216(3), and the coverage cell 220(4) is the home coverage cell served by the RRH 216(4).

In a non-limiting example, the coverage cells 220(1)-220(4) are neighboring coverage cells that overlap, at least partially, in a plurality of overlapping coverage areas 222(1)-222(4). As shown in FIG. 2B, the coverage cell 220(1) overlaps with the coverage cell 220(2) in the overlapping coverage area 222(1), the coverage cell 220(2) overlaps with the coverage cell 220(3) in the overlapping coverage area 222(2), the coverage cell 220(3) overlaps with the coverage cell 220(4) in the overlapping coverage area 222(3), and the coverage cell 220(4) overlaps with the coverage cell 220(1) in the overlapping coverage area 222(4). In this regard, the coverage cells 220(2), 220(4) are neighboring coverage cells to the coverage cell 220(1), the coverage cells 220(1), 220(3) are neighboring coverage cells to the coverage cell 220(2), the coverage cells 220(2), 220(4) are neighboring coverage cells to the coverage cell 220(3), and the coverage cells 220(1), 220(3) are neighboring coverage cells to the coverage cell 220(4).

For the convenience of reference and illustration, the client devices 218(1)-218(17) are divided into two categories, which are referred to as "in-cell client devices" and "cell-boundary client devices." In examples discussed hereinafter, "in-cell client devices" refer to client devices located inside any of the coverage cells 220(1)-220(4), but outside any of the overlapping coverage areas 222(1)-222(4). In this regard, as shown in FIG. 2B, the client devices 218(1), 218(6) are in-cell client devices of the coverage cell 220(1), the client devices 218(7)-218(9) are in-cell client devices of the coverage cell 220(2), the client devices 218(11)-218(13) are in-cell client devices of the coverage cell 220(3), and the client devices 218(16), 218(17) are in-cell client devices of the coverage cell 220(4). In contrast, "cell-boundary client devices" refer to client devices located inside any of the overlapping coverage areas 222(1)-222(4). In this regard, as shown in FIG. 2B, the client devices 218(2), 218(3) are cell-boundary client devices inside the overlapping coverage area 222(1), the client devices 218(10) is a cell-boundary client device inside the overlapping coverage area 222(2), the client devices 218(14), 218(15) are cell-boundary client devices inside the overlapping coverage area 222(3), and the client devices 218(4), 218(5) are cell-boundary client devices inside the overlapping coverage area 222(4).

With continuing reference to FIG. 2B, the RRHs 216(1)-216(4) include a plurality of antenna arrays 224(1)-224(4), respectively. Notably, each of the antenna arrays 224(1)-224(4) can include a plurality of antennas 225(1)-225(M) that can be configured to support MIMO and/or beamforming operations as previously described in FIG. 2A in a respective home coverage cell among the coverage cells 220(1)-220(4). Together, the antenna arrays 224(1)-224(4) and the multiple antennas 225(1)-225(M) in each of the antenna arrays 224(1)-224(4) can form a distributed antenna array to perform MU-MIMO operations (e.g., simultaneously) to the client devices 218(1)-218(17) located in the conventional network MIMO system 214.

According to pervious discussions in FIG. 2A, each of the RRHs 216(1)-216(4) is configured to communicate a plurality of wireless communications signals 226(1)-226(K) in a plurality of RF beams 228(1)-228(K). To maximize spectral efficiency throughout the conventional network MIMO system 214, each of the RRHs 216(1)-216(4) is configured to communicate the wireless communications signals 226(1)-226(K) to the client devices 218(1)-218(17) based on the same time-frequency resource, which includes RF carriers in a frequency domain and symbol streams in a time domain. As such, as discussed earlier in FIG. 2A, intra-cell interference (e.g., CCI) may occur between the RF beams 210(1)-210(4), thus causing severe degradation in the wireless communications signals 212(1)-212(4). Moreover, given that the conventional network MIMO system 214 can potentially include a large number of RRHs for supporting MU-MIMO operations in a large number of coverage cells, some of the client devices 218(1)-218(17), particularly the cell-boundary client devices located in the overlapping coverage areas 222(1)-222(4), may also suffer inter-cell interferences from an RRH(s) in a neighboring coverage cell(s).

The wireless communications signals 226(1)-226(K) communicated by an RRH 216(i) (1≤i≤N), wherein N represents the total number of RRHs (e.g., N=4 as shown in FIG. 2B) in the conventional network MIMO system 214, can be collectively referred to as a transmitted signal $s_i$ and expressed in the equation (Eq. 1) below.

$$s_i = W_i a_i = \sum_{k=1}^{K} w_{i,k} a_{i,k} = [w_{i,1} \ w_{i,2} \ \ldots \ w_{i,K}] \begin{bmatrix} a_{i,1} \\ a_{i,2} \\ \vdots \\ a_{i,K} \end{bmatrix}$$ (Eq. 1)

$$= \begin{bmatrix} w_{i,1,1} & w_{i,2,1} & \ldots & w_{i,K,1} \\ w_{i,1,2} & w_{i,2,2} & \ldots & w_{i,K,2} \\ \vdots & \vdots & \ddots & \vdots \\ w_{i,1,M} & w_{i,2,M} & \ldots & w_{i,K,M} \end{bmatrix} \begin{bmatrix} a_{i,1} \\ a_{i,2} \\ \vdots \\ a_{i,K} \end{bmatrix}$$

In the equation (Eq. 1) above, K represents the number of the client devices 218(1)-218(K), and therefore the number of the RF beams 228(1)-228(K), in the coverage cell 220(i) of the RRH 216(i). M represents number of the antennas 225(1)-225(M) in the RRH 216(i). Herein, each of the client devices 218(1)-218(K) in the coverage cell 220(i) is assumed to include a single antenna. $W_i$ represents an M×K pre-coding matrix for the RRH 216(i), $a_i$ represents a K×1 transmitted symbol vector for the RRH 216(i), $w_{i,k}$ represents an M×1 pre-coding vector for the client device 218(k) (1≤k≤K), and $a_{i,k}$ represents transmitted symbol for the client device 218(k) by the RRH 216(i).

The transmitted signal $s_i$ is received by the client device 218(k) in the coverage cell 220(i) as a received signal $x_{i,k}$, which can be generalized in the equation (Eq. 2) below.

$$x_{i,k} = \Sigma_j \sqrt{\rho_j} H_{j,k} W_j a_j + n_i$$ (Eq. 2)

In the equation (Eq. 2) above, $\rho_i$ represents the signal-to-noise ratio (SNR) of the received signal $x_{i,k}$, $n_i$ represents white Gaussian noise with a power of one (1), and $H_{j,k}$ represents a 1×M channel matrix between the client device 218(k) in the coverage cell 220(i) and the antennas 225(1)-225(M) in the RRH 216(j) of the coverage cell 220(j) (1≤j≤N, j≠i). By substituting equation (Eq. 2) into equation (Eq. 1), the received signal $x_{i,k}$ can be further expressed in the equation (Eq. 3) below.

$$x_{i,k} = \sqrt{\rho_i} H_{i,k} w_{i,k} a_{i,k} + \sqrt{\rho_i} H_{i,k} \Sigma_{m \neq k}^{K} w_{i,m} a_{i,m} + \sqrt{\rho_j} \Sigma_{j \neq i}^{4} \Sigma_{m=1}^{K} H_{j,k} w_{j,m} a_{j,k} + n_i$$ (Eq. 3)

In the equation (Eq. 3) above, the first term $\sqrt{\rho_i} H_{i,k} w_{i,k} a_{i,k}$ represents the desired wireless communications signal received by the client device 218(k) in the coverage cell 220(i), the second term $\sqrt{\rho_i} H_{i,k} \Sigma_{m \neq k}^{K} w_{i,m} a_{i,m}$ represents intra-cell interference, and the third term $\sqrt{\rho_j} \Sigma_{j \neq i}^{4} \Sigma_{m=1}^{K} H_{j,k} w_{j,m} a_{j,k}$ represents inter-cell interference. In this regard, in the conventional network MIMO system 214 of FIG. 2B, each of the client devices 218(1)-218(17), particularly those client devices located in the overlapping coverage areas 222(1)-222(4), can be subject to intra-cell and/or inter-cell interferences.

With continuing reference to FIG. 2B, the intra-cell and/or inter-cell interferences experienced by each of the client devices 218(1)-218(17) can be seen as superposition of signals that were intended for other client devices in the conventional network MIMO system 214. In this regard, if the wireless communications signals 226(1)-226(K) communicated by each of the RRHs 216(1)-216(4) can be controlled in the frequency domain and the time domain, it may be possible to suppress the intra-cell and/or the inter-cell interferences to help detect and receive the desired wireless communications signal represented by the first term of the equation (Eq. 3).

Theoretically, when a matched filter (MF) is used in each of the RRHs 216(1)-216(4), which means $w_{i,k} = H_{i,k}^*$, and the number of antennas 225(1)-225(M) in each of the RRHs 216(1)-216(4) increases to infinity, the intra-cell and the inter-cell interferences may disappear completely if the RF channel between each of the client devices 218(1)-218(17) and each of the RRHs 216(1)-216(4) follows independent Rayleigh distribution. However, it would be impossible for any of the RRHs 216(1)-216(4) to include an infinite number of the antennas 225(1)-225(M). In this regard, it is necessary to mitigate the intra-cell and inter-cell interferences to make the conventional network MIMO system 214 practically usefully.

According to previous discussions in FIG. 2A, each of the RRHs 216(1)-216(4) can be configured to mitigate intra-cell interference in a respective home coverage cell by pre-coding the respective symbol streams for each of the wireless communications signals 226(1)-226(K) and/or controlling the respective RF power in each of the RF beams 228(1)-228(K). Furthermore, the RRHs 216(1)-216(4) can be configured to mitigate the inter-cell interferences in the overlapping coverage areas 222(1)-222(4) through CS and/or CB. More specifically, each of the RRHs 216(1)-216(4) receives channel-data information (e.g., CSI) from respective client devices located in a respective home coverage cell. In a non-limiting example, the channel-data information received via the CSI includes explicit and implicit physical channel feedback, such as channel quality indication (CQI), pre-coding matrix indicator (PMI), and rank indicator (RI). The RRHs 216(1)-216(4) share the channel-data information received from all of the client devices 218(1)-218(17) in the conventional network MIMO system 214 via a backbone network. As such, each of the RRHs 216(1)-216(4) can use the channel-data information related to all of the client devices 218(1)-218(17) to pre-code the wireless communications signals 226(1)-226(K) in the respective coverage cell among the coverage cells 220(1)-220(4). In addition, the RRHs 216(1)-216(4) can coordinate among each other to ensure that each of the client devices 218(1)-218(17) in the conventional network MIMO system 214 communicates with only one of the RRHs 216(1)-216(4). For example, for the client devices 218(2), 218(3) that are located in the overlapping coverage area 222(1), the RRHs 216(1), 216(2) can cooperatively determine that the client device 218(2) will only communicate with the RRH 216(1), and the client device 218(3) will only communicate with the RRH 216(2). Accordingly, the RRHs 216(1)-216(4) can be referred to as cooperative RRHs, and the overlapping coverage areas 222(1)-222(4) can be referred to as cooperative areas.

With each of the RRHs 216(1)-216(4) being configured to cooperate based on CS/CB in the conventional network MIMO system 214, the transmitted signal $s_i$ communicated by the RRH 216($i$) (1≤i≤N) can be expressed in the equation (Eq. 4) below.

$$s_i = W_i a_i = \sum_{k=1}^{N*K} w_{i,k} a_{i,k} = [w_{i,1} \ w_{i,2} \ \ldots \ w_{i,N*K}] \begin{bmatrix} a_{i,1} \\ a_{i,2} \\ \vdots \\ a_{i,N*K} \end{bmatrix} \quad (Eq.\ 4)$$

$$\begin{bmatrix} w_{i,1,1} & w_{i,2,1} & \cdots & w_{i,N*K,1} \\ w_{i,1,2} & w_{i,2,2} & \cdots & w_{i,N*K,2} \\ \vdots & \vdots & \ddots & \vdots \\ w_{i,1,M} & w_{i,2,M} & \cdots & w_{i,N*K,M} \end{bmatrix} \begin{bmatrix} a_{i,1} \\ a_{i,2} \\ \vdots \\ a_{i,N*K} \end{bmatrix}$$

In the equation (Eq. 4) above, $W_i$ represents M×N*K pre-coding matrix for RRH 216($i$), in which M represents the number of the antennas 225(1)-225(M) in the RRH 216($i$), K represents number of the client devices 218(1)-218(K) in the coverage cell 220($i$), and N represents the total number of RRHs (e.g., N=4 as shown in FIG. 2B) in the conventional network MIMO system 214. In addition, $a_i$ represents an N*K×1 transmitted symbol vector for the RRH 216($i$), $w_{i,k}$ represents an M×1 pre-coding vector for the client device 218($k$) (1≤k≤K), and $a_{i,k}$ represents transmitted symbol for the client device 218($k$) by the RRH 216($i$). In this regard, in the conventional network MIMO system 214 as shown in FIG. 2B, each of the RRHs 216(1)-216(4) needs to receive and process 4*K channel-data information. Accordingly, for a larger-scale network MIMO system including N RRHs, each of the RRHs would need to receive and process N*K channel-data information. As such, processing overhead and complexity for the RRHs 216(1)-216(4) can become prohibitively high.

In the conventional network MIMO system 214, a received signal $x_{i,k}$ received by the client device 218($k$) in the coverage cell 220($i$) can be generalized in the equation (Eq. 5) below.

$$x_{i,k} = \Sigma_j \sqrt{\rho_j} H_{j,k} w_{j,k} a_{j,k} + \Sigma_j \sqrt{\rho_j} H_{j,k} \Sigma_{m \neq k}^{N*K} w_{j,m} a_{j,m} + n_i \quad (Eq.\ 5)$$

In the equation (Eq. 5) above, $H_{j,k}$ represents a 1×M channel matrix between the client device 218($k$) in the coverage cell 220($i$) and the antennas 225(1)-225(M) in the RRH 216($j$) of the coverage cell 220($j$) (1≤j≤N, j≠i). When the large-scale factor of $H_{j,k}$ between the RRHs 216(1)-216(4) is similar, it may be possible to maximize a combination gain of the desired wireless communications signal, which is represented by the first term $\Sigma_j \sqrt{\rho_j} H_{j,k} w_{j,k} a_{j,k}$ in the equation (Eq. 5), while minimizing the inter-cell interference, which is represented by the second term $\Sigma_j \sqrt{\rho_j} H_{j,k} \Sigma_{m \neq k}^{N+K} w_{j,m} a_{j,m}$ in the equation (Eq. 5), for the client devices located in the overlapping coverage areas 222(1)-222(4). However, given that the large-scale factor of $H_{j,k}$ may not be similar at the same time outside the overlapping coverage areas 222(1)-222(4), the combination gain for the desired wireless communications signal may be small and the inter-cell interferences for the client devices located outside the overlapping coverage areas 222(1)-222(4) may become significant. In this regard, it may be desired to enhance the conventional network MIMO system 214 to mitigate inter-cell interferences for the cell-boundary client devices, while reducing computational overhead and complexity associated with processing the channel-data information related to all of the client devices 218(1)-218(17).

Figure 3:
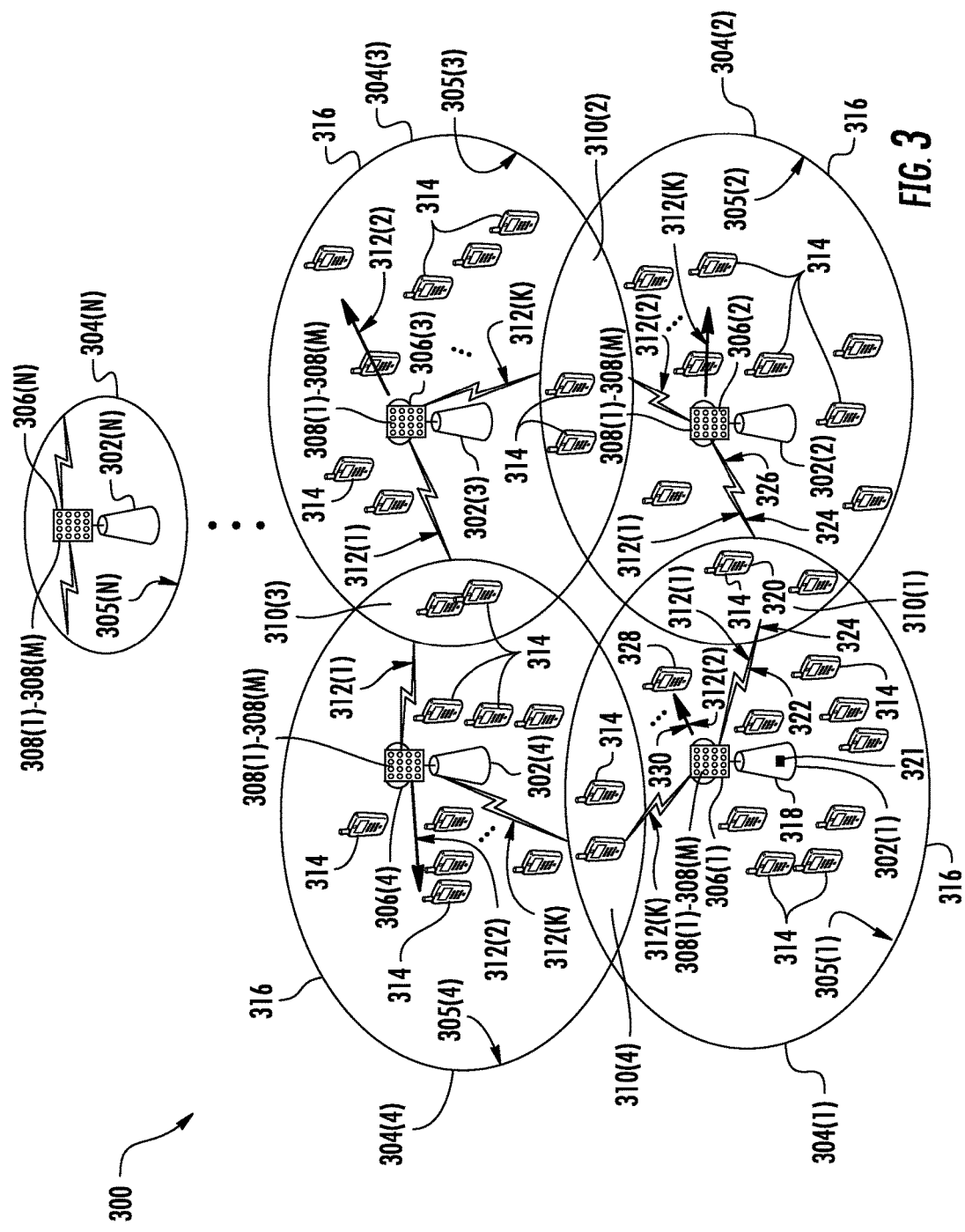
FIG. 3 is a schematic diagram of an exemplary WDS in which a plurality of remote units is configured to support cooperative transmission in a plurality of coverage cells with reduced computational overhead and enhanced inter-cell interference mitigation compared to the conventional network MIMO system of FIG. 2B.

In this regard, FIG. 3 is a schematic diagram of an exemplary WDS 300 in which a plurality of remote units 302(1)-302(N) is configured to support cooperative transmission in a plurality of coverage cells 304(1)-304(N) with reduced computational overhead and enhanced inter-cell interference mitigation compared to the conventional network MIMO system 214 of FIG. 2B. The coverage cells 304(1)-304(N) are determined by a plurality of cell boundaries 305(1)-305(N), respectively. The remote units 302(1)-302(N) include a plurality of antenna arrays 306(1)-306(N), respectively. Each of the antenna arrays 306(1)-306(N) includes a plurality of antennas 308(1)-308(M). In this regard, the remote units 302(1)-302(N) can be configured to provide similar functionalities as the RRHs 216(1)-216(4) in the conventional network MIMO system 214 of FIG. 2B.

Although the remote units 302(1)-302(N) in the WDS 300 are functionally equivalent to the RRHs 216(1)-216(4) in the conventional network MIMO system 214, the WDS 300 is distinctively different from the conventional network MIMO system 214 in several aspects. In one aspect, unlike the conventional network MIMO system 214, in which each of the client devices 218(1)-218(17) only communicates with one of the RRHs 216(1)-214(4), multiple cooperative remote units among the remote units 302(1)-302(N) can coordinate with each other to help mitigate inter-cell interference for a client device(s) located in a cooperative area(s) by forming at least two RF beams to communicate a downlink signal(s) (e.g., simultaneously) to the client device (s). In this regard, the client device(s) would be communicating with at least two of the remote units 302(1)-302(N). As a result, it is possible to improve the SINR of the downlink signal(s) received by the client device(s), thus mitigating inter-cell interference for the client device(s). In another aspect, as opposed to the conventional network MIMO system 214 in which the RRHs 216(1)-216(4) cooperate with each other based on the channel-data information received from all of the client devices 218(1)-218(17), the multiple cooperative remote units in the WDS 300 cooperate solely based on the channel-data information provided by the client device(s) in the cooperative area(s). Accordingly, it is also possible to reduce processing overhead and complexity for the multiple cooperative remote units, thus helping to improve robustness and performance of the WDS 300.

For the convenience of reference and illustration, the remote units 302(1)-302(4) and the coverage cells 304(1)-304(4) are discussed herein as non-limiting examples. It should be appreciated that the configuration and operation principles discussed with reference to the remote units 302(1)-302(4) are generally applicable to all of the remote units 302(1)-302(N) in the WDS 300.

In a non-limiting example, the coverage cells 304(1)-304(4) are neighboring coverage cells that overlap, at least partially, with each other in a plurality of overlapping coverage areas 310(1)-310(4). Each of the remote units 302(1)-302(4) defines a home coverage cell among the coverage cells 304(1)-304(4) to communicate one or more downlink signals 312(1)-312(K) to one or more client devices 314 located within a boundary 316 of the home coverage cell. For example, the remote unit 302(1) defines the coverage cell 304(1) as the home coverage cell and communicates the downlink signals 312(1)-312(K) to the client devices 314 located within the boundary 316 of the coverage cell 304(1). In a non-limiting example, the coverage cells 304(2)-304(4) are neighboring coverage cells to the home coverage cell 304(1). Accordingly, the remote units 302(2)-302(4) are cooperative remote units to the remote unit 302(1), and the overlapping coverage areas 310(1)-310(4) are cooperative areas for the remote units 302(1)-302(4). In this regard, the remote units 302(1)-302(4) are configured to coordinate with each other to help mitigate inter-cell interferences for the client devices 314 located in the overlapping coverage areas 310(1)-310(4).

In a non-limiting example, a selected remote unit 318, for example the remote unit 302(1), is configured to coordinate with a neighboring remote unit, for example the remote unit 302(2), to mitigate the inter-cell interference for at least one selected client device 320 located in the overlapping coverage area 310(1). In this regard, the coverage cell 304(1) is also the home coverage cell of the selected remote unit 318, and the coverage cell 304(2) is the neighboring coverage cell defined by the remote unit 302(2). Thus, the remote unit 302(2) is the cooperative remote unit of the selected remote unit 318, and the overlapping coverage area 310(1) is the cooperative area for the selected remote unit 318. Notably, the selected client device 320 can also be in any of the overlapping coverage areas 310(2)-310(4). Accordingly, any of the remote units 302(2)-302(4) can be the neighboring remote unit that cooperates with the selected remote unit 318. Likewise, the selected remote unit 318 can also be any of the remote units 302(2)-302(4).

Continuing with the non-limiting example above, the selected remote unit 318 includes a control circuit 321, which can be a microcontroller, a microprocessor, or a field-programmable gate array (FPGA), for example. Notably, the control circuit 321 can be included in any of the remote units 302(1)-302(4). The control circuit 321 identifies the selected client device 320 located in the overlapping coverage area 310(1) and receives channel-data information from the selected client device 320. For example, the selected remote unit 318 can receive the channel-data information based on at least one CSI provided by the selected client device 320. The control circuit 321 in the selected remote unit 318 is configured to form a first RF beam 322 based on the channel-data information received from the selected client device 320 to distribute at least one first downlink signal 324 among the downlink signals 312(1)-312(K) to the selected client device 320. The control circuit 321 in the selected remote unit 318 is also configured to coordinate with the neighboring remote unit 302(2) based on the channel-data information received from the selected client device 320 to form a second RF beam 326 to communicate the first downlink signal 324 from the neighboring remote unit 302(2) to the selected client device 320.

The control circuit 321 in the selected remote unit 318 coordinates with a respective control circuit in the neighboring remote unit 302(2) to form the first RF beam 322 and the second RF beam 326 based on a defined time-frequency resource. In a non-limiting example, the defined time-frequency resource includes an identical number of RF carriers (e.g., subcarriers) and an identical number of symbol streams. The selected remote unit 318 and the neighboring remote unit 302(2) are each configured to pre-code the first downlink signal 324 based on the channel-data information to provide phase coherency between the first RF beam 322 and the second RF beam 326. In a non-limiting example, the phase coherency between the first RF beam 322 and the second RF beam 326 means that the first RF beam 322 and the second RF beam 326 maintain a constant phase difference, thus allowing the first RF beam 322 and the second RF beam 326 to be linearly combined at the selected client device 320. As such, the selected client device 320 can receive the first RF beam 322 and the second RF beam 326 (e.g., simultaneously) from the selected remote unit 318 and the neighboring remote unit 302(2). Accordingly, the selected client device 320 may linearly combine the first downlink signal 324 received via the first RF beam 322 and the second RF beam 326 to improve the SINR of the first downlink signal 324. As a result, the inter-cell interference for the selected client device 320 may be mitigated.

Figure 4:
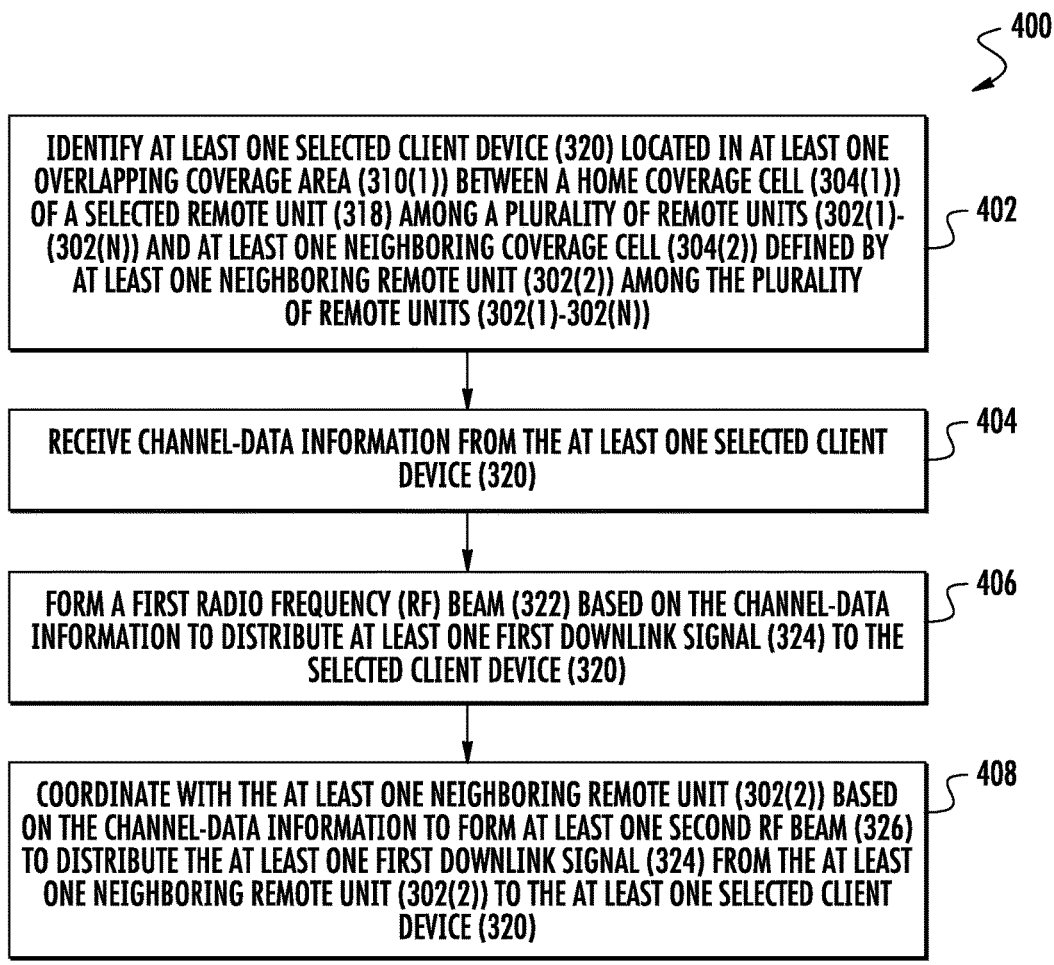
FIG. 4 is a flowchart of an exemplary process that can be employed by a selected remote unit among the remote units in FIG. 3 to support cooperative transmission in the WDS.

The selected remote unit 318 can be configured to cooperate with the neighboring remote unit 302(2) according to a process. In this regard, FIG. 4 is a flowchart of an exemplary process 400 that can be employed by the selected remote unit 318 in FIG. 3 to support cooperative transmission in the WDS 300. According to the process 400, the selected remote unit 318 identifies the selected client device 320 located in the overlapping coverage area 310(1) between the home coverage cell 304(1) of the selected remote unit 318 and the neighboring coverage cell 304(2) defined by the neighboring remote unit 302(2) (block 402). The selected remote unit 318 receives the channel-data information from the selected client device 320 (block 404). The selected remote unit 318 forms the first RF beam 322 based on the channel-data information to distribute the first downlink signal 324 to the selected client device 320 (block 406). The selected remote unit 318 coordinates with the neighboring remote unit 302(2) based on the channel-data information to form the second RF beam 326 to distribute the first downlink signal 324 from the neighboring remote unit 302(2) to the selected client device 320 (block 408).

With reference back to FIG. 3, the selected remote unit 318 is also configured to identify at least one second selected client device 328 located within the boundary 316 of the home coverage cell 304(1) of the selected remote unit 318, but outside the overlapping coverage area 310(1). The selected remote unit 318 is further configured to distribute at least one second downlink signal 330 among the downlink signals 312(1)-312(K) to the second selected client device 328. The selected remote unit 318 may distribute the second downlink signal 330 (e.g., simultaneously) with the first downlink signal 324 based on the defined time-frequency resource. The selected remote unit 318 may pre-code the second downlink signal 330 to provide spatial separation from the first downlink signal 324, thus helping to mitigate intra-cell interference between the first downlink signal 324 and the second downlink signal 330.

In the WDS 300, a transmitted signal $s_1$ communicated by the remote unit 302($i$) (1≤i≤N) can be expressed in the equation (Eq. 6) below.

$$s_i = W_i a_i = \sum_{k=1}^{K+L} w_{i,k} a_{i,k} = [w_{i,1} \; w_{i,2} \; \ldots \; w_{i,K+L}] \begin{bmatrix} a_{i,1} \\ a_{i,2} \\ \vdots \\ a_{i,K+L} \end{bmatrix}$$ (Eq. 6)

$$= \begin{bmatrix} w_{i,1,1} & w_{i,2,1} & \cdots & w_{i,K+L,1} \\ w_{i,1,2} & w_{i,2,2} & \cdots & w_{i,K+L,2} \\ \vdots & \vdots & \ddots & \vdots \\ w_{i,1,M} & w_{i,2,M} & \cdots & w_{i,K+L,M} \end{bmatrix} \begin{bmatrix} a_{i,1} \\ a_{i,2} \\ \vdots \\ a_{i,K+L} \end{bmatrix}$$

In the equation (Eq. 6) above, $W_i$ represents an M×(K+L) pre-coding matrix for remote unit 302($i$), in which M represents the number of the antennas 308(1)-308(M) in the remote unit 302($i$), K represents number of the client devices 314 in the coverage cell 304($i$), and L represents number of the client devices 314 located in an overlapping coverage area defined by a neighboring remote unit cooperating with the remote unit 302($i$). In addition, $a_i$ represents a (K+L)×1 transmitted symbol vector for the RRH 216($i$), $w_{i,k}$ represents an M×1 pre-coding vector of a client device 314($k$) (1≤k≤K), and $a_{i,k}$ represents transmitted symbol for the client device 314($k$).

A received signal $x_{i,k}$ received by an in-cell client device 314($k$), such as the second selected client device 328 located in the home coverage cell 304(1) and outside the overlapping coverage area 310(1), can be expressed in the equation (Eq. 7) below.

$$x_{i,k} = \sqrt{\rho_j} H_{i,k} w_{i,k} a_{i,k} + \sqrt{\rho_j} H_{i,k} \Sigma_{m \neq k}^{K+L} w_{i,m} a_{i,m} + \sqrt{\rho_j} \Sigma_{j \neq i}^{A} \Sigma_{m=1}^{K+L} H_{j,k} w_{j,m} a_{j,m} + n_i$$ (Eq. 7)

A received signal $x_{i,k}$ received by a cell-boundary client device 314($k$), such as the selected client device 320 located in the overlapping coverage area 310(1), can be expressed in the equation (Eq. 8) below.

$$x_{i,k} = \Sigma_j^{Ncop} \sqrt{\rho_j} H_{j,k} w_{j,k} a_{j,k} + \Sigma_j \sqrt{\rho_j} H_{j,k} \Sigma_{m \neq k+k}^{K+L} w_{j,m} a_{j,m} + n_i$$ (Eq. 8)

In the equation (Eq. 8) above, $N_{cop}$ represents the number of cooperative remote units for a client device 314($k$). For example, for the selected client device 320, the selected remote unit 318 and the neighboring remote unit 302(2) are cooperating in the overlapping coverage area 310(1). In this regard, $N_{cop}$ equals two (2) for the selected client device 320. Given that the selected remote unit 318 coordinates with the neighboring remote unit 302(2) based on the channel-data information received from the selected client device 320, the large-scale factor of $H_{j,k}$ for the selected remote unit 318 and the neighboring remote unit 302(2) would be similar. Thus, assuming that the selected client device 320 is indexed as K+k among the client devices 314 in the coverage cell 304(1), the combined gain of the first downlink signal 324, which is represented by the term $\Sigma_j^{Ncop} \sqrt{\rho_j} H_{j,k} w_{j,k} a_{j,k}$ in the equation (Eq. 8), can be maximized. In addition, the inter-cell interference represented by the term $\Sigma_j \sqrt{\rho_j} H_{j,k} \Sigma_{m \neq K+k}^{K+L} w_{j,m} a_{j,m}$ can be minimized.

Figure 5A:
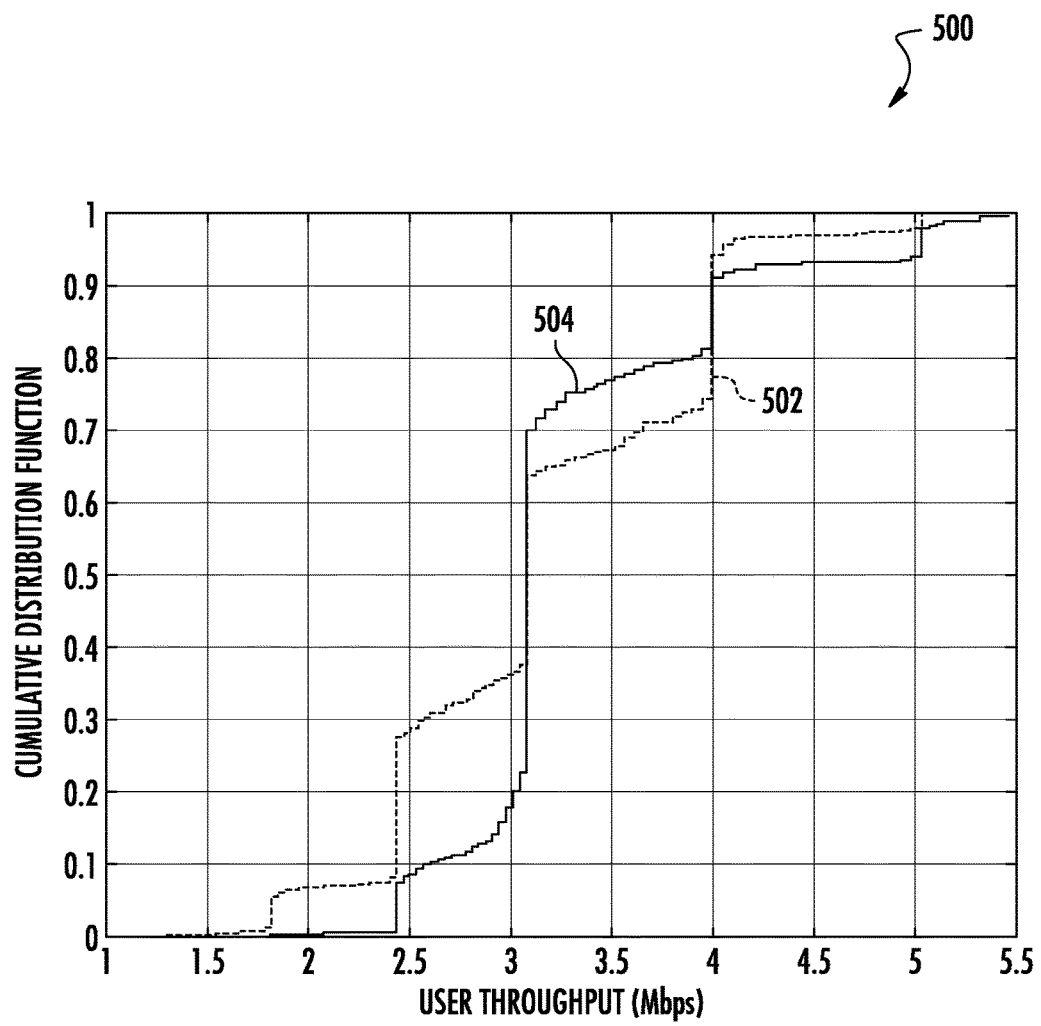
FIG. 5A is a graph providing an exemplary illustration of user throughput comparison between the conventional network MIMO system of FIG. 2B and the WDS of FIG. 3 in which the remote units cooperate based on matched-filter (MF) pre-coding.

Performance of the WDS 300 may be validated based on simulations. In this regard, FIG. 5A is a graph 500 providing an exemplary illustration of user throughput comparison between the conventional network MIMO system 214 of FIG. 2B and the WDS 300 of FIG. 3 in which the remote units 302(1)-302(N) cooperate based on MF pre-coding.

The graph 500 includes a first curve 502 and a second curve 504. The first curve 502 represents user throughput in the conventional network MIMO system 214, and the second curve 504 represents user throughput in the WDS 300. The first curve 502 and the second curve 504 are plotted based on a system level simulation configured according to parameters listed in Table 1 below.

TABLE 1

| Parameters | Assumption |
|---|---|
| Coverage Area | 50-meter × 50-meter, with 4 remote units |
| Antenna | 50 antennas per remote unit |
| Carrier Frequency | Center Frequency (CF) = 2 GHz |
| Channel Model | Pathloss model: Winner Indoor Office Small Scale Fading: independent and identically distributed (i.i.d.) |
| Number of Client Devices | 40 |
| Client Device Speed of Interest | 3 kilometers per hour (km/h) |
| Total Transmit Power ($P_{total}$) | 17 dBm, 20 MHz carrier |
| Thermal Density Power | −174 dBm |
| Noise Figure | 9 dB |
| Scheduling Algorithm | Full bandwidth scheduling |
| Channel Estimation | Precise |

The system level simulation is conducted by randomly dropping the client devices into the 50-meter×50-meter coverage area and based on long-term evolution (LTE) with massive MIMO incorporated into the simulation system.

Figure 5B:
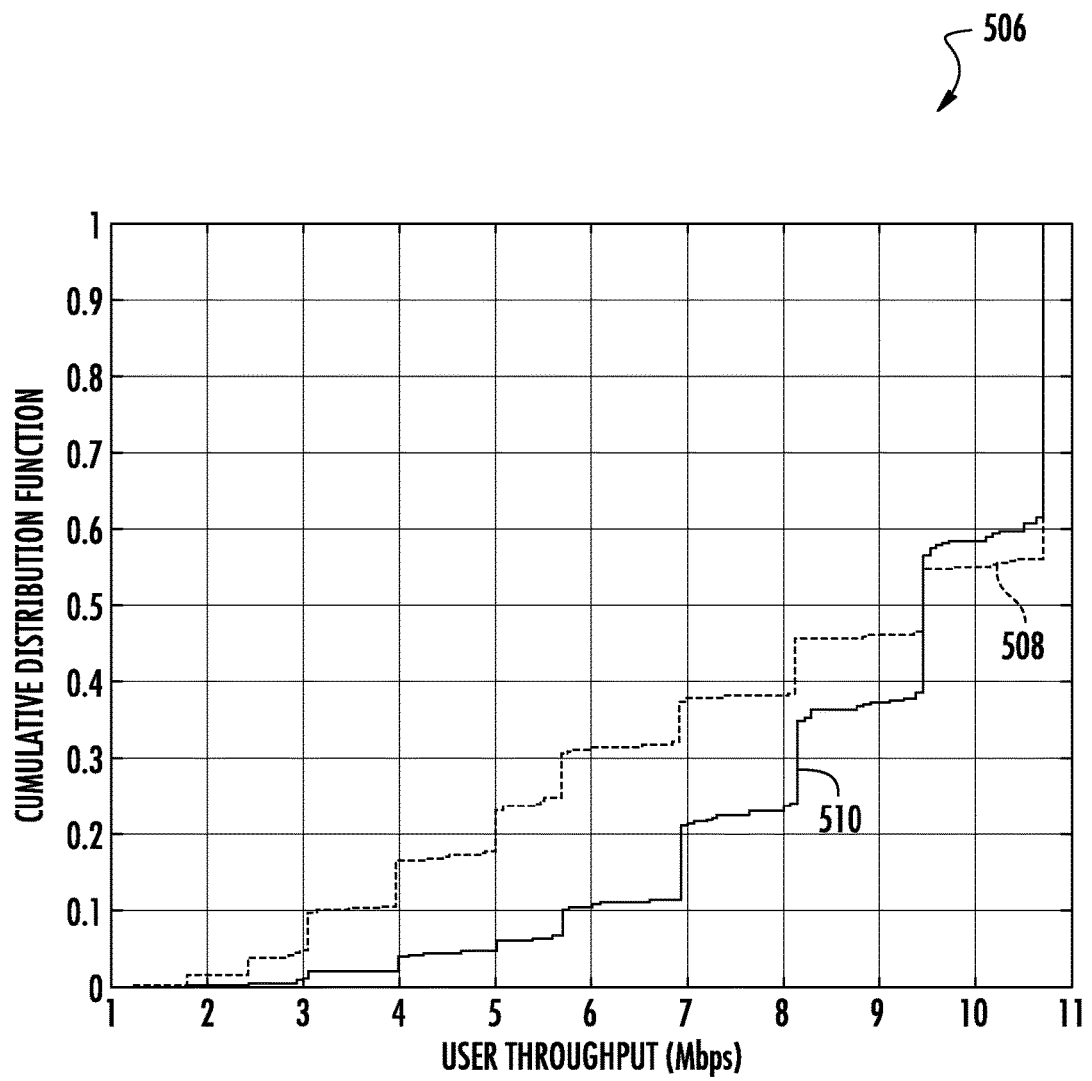
FIG. 5B is a graph providing an exemplary illustration of user throughput comparison between the conventional network MIMO system of FIG. 2B and the WDS of FIG. 3 in which the remote units cooperate based on zero-forcing (ZF) pre-coding.

FIG. 5B is a graph 506 providing an exemplary illustration of user throughput comparison between the conventional network MIMO system 214 of FIG. 2B and the WDS 300 of FIG. 3 in which the remote units 302(1)-302(N) cooperate based on zero-forcing (ZF) pre-coding.

The graph 506 includes a first curve 508 and a second curve 510. The first curve 508 represents user throughput in the conventional network MIMO system 214, and the second curve 510 represents user throughput in the WDS 300. The first curve 508 and the second curve 510 are plotted based on the system level simulation configured according to parameters listed in the Table 1 above.

Simulation result and comparisons as plotted in FIGS. 5A-5B are summarized in Table 2 below.

TABLE 2

| Precoding | Transmission Method | 5% User Throughput (Mbps) | Remote Unit Average Throughput (Mbps) |
|---|---|---|---|
| MF | Conventional Network MIMO System (214) | 1.8 | 31.38 |
| | WDS (300) | 2.45 | 32.74 |
| | Performance Gain | 36.11% | 4.34% |
| ZF | Conventional Network MIMO System (214) | 3 | 80.86 |

TABLE 2-continued

| Precoding | Transmission Method | 5% User Throughput (Mbps) | Remote Unit Average Throughput (Mbps) |
|---|---|---|---|
| | WDS (300) | 4.5 | 89.36 |
| | Performance Gain | 50% | 10.5% |

Figure 6:
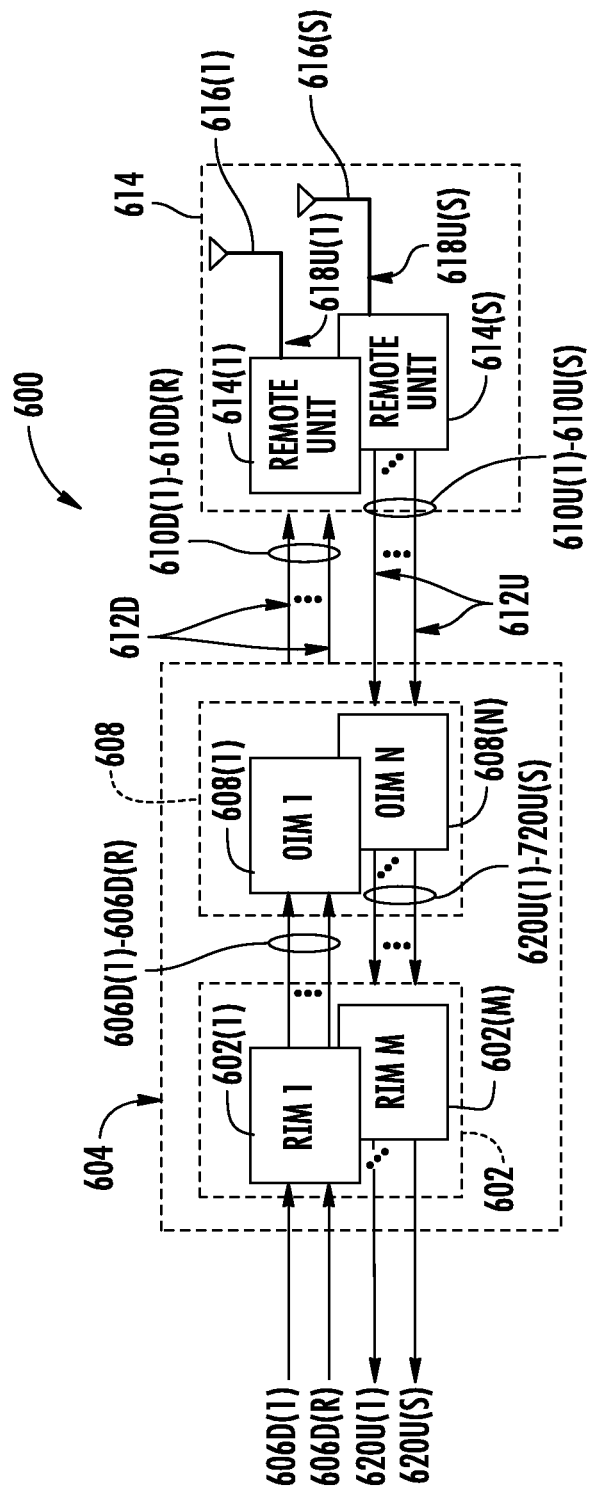
FIG. 6 is a schematic diagram of an exemplary WDS provided in the form of an optical fiber-based WDS that can include the remote units of FIG. 3 for supporting cooperative transmission in the WDS of FIG. 3.

FIG. 6 is a schematic diagram of an exemplary WDS 600 provided in the form of an optical fiber-based WDS that can include the remote units 302(1)-302(N) of FIG. 3 for supporting cooperative transmission in the WDS 300. The WDS 600 includes an optical fiber for distributing communications services for multiple frequency bands. The WDS 600 in this example is comprised of three (3) main components. A plurality of radio interfaces provided in the form of radio interface modules (RIMs) 602(1)-602(M) are provided in a central unit 604 to receive and process a plurality of downlink communications signals 606D(1)-606D(R) prior to optical conversion into downlink optical fiber-based communications signals. The downlink communications signals 606D(1)-606D(R) may be received from a base station as an example. Each of the downlink communications signals 606D(1)-606D(R) may include the downlink signals 312(1)-312(K) in FIG. 3 to be distributed by each of the remote units 302(1)-302(N). The RIMs 602(1)-602(M) provide both downlink and uplink interfaces for signal processing. The notations "1-R" and "1-M" indicate that any number of the referenced component, 1-R and 1-M, respectively, may be provided. The central unit 604 is configured to accept the RIMs 602(1)-602(M) as modular components that can easily be installed and removed or replaced in the central unit 604. In one example, the central unit 604 is configured to support up to twelve (12) RIMs 602(1)-602(12). Each of the RIMs 602(1)-602(M) can be designed to support a particular type of radio source or range of radio sources (i.e., frequencies) to provide flexibility in configuring the central unit 604 and the WDS 600 to support the desired radio sources.

For example, one RIM 602 may be configured to support the Personalized Communications System (PCS) radio band. Another RIM 602 may be configured to support the 800 megahertz (MHz) radio band. In this example, by inclusion of the RIMs 602(1)-602(M), the central unit 604 could be configured to support and distribute communications signals on both PCS and Long-Term Evolution (LTE) 700 radio bands, as an example. The RIMs 602(1)-602(M) may be provided in the central unit 604 that support any frequency bands desired, including, but not limited to, the US Cellular band, PCS band, Advanced Wireless Service (AWS) band, 700 MHz band, Global System for Mobile communications (GSM) 900, GSM 1800, and Universal Mobile Telecommunications System (UMTS). The RIMs 602(1)-602(M) may also be provided in the central unit 604 that support any wireless technologies desired, including, but not limited to, Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 602(1)-602(M) may be provided in the central unit 604 that support any frequencies desired, including, but not limited to, US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 6, the downlink communications signals 606D(1)-606D(R) are provided to a plurality of optical interfaces provided in the form of optical interface modules (OIMs) 608(1)-608(N) in this embodiment to convert the downlink communications signals 606D(1)-606D(R) into a plurality of downlink optical fiber-based communications signals 610D(1)-610D(R). The notation "1-N" indicates that any number of the referenced component 1-N may be provided. The OIMs 608(1)-608(N) may be configured to provide a plurality of optical interface components (OICs) that contain optical-to-electrical (O/E) and electrical-to-optical (E/O) converters, as will be described in more detail below. The OIMs 608(1)-608(N) support the radio bands that can be provided by the RIMs 602(1)-602(M), including the examples previously described above.

The OIMs 608(1)-608(N) each include E/O converters to convert the downlink communications signals 606D(1)-606D(R) into the downlink optical fiber-based communications signals 610D(1)-610D(R). The downlink optical fiber-based communications signals 610D(1)-610D(R) are communicated over a downlink optical fiber-based communications medium 612D to a plurality of remote units 614(1)-614(S). In a non-limiting example, the remote units 614(1)-614(S) can be provided as or replaced by the remote units 302(1)-302(N) for supporting cooperative transmission. The notation "1-S" indicates that any number of the referenced component 1-S may be provided. Remote unit O/E converters provided in the remote units 614(1)-614(S) convert the downlink optical fiber-based communications signals 610D(1)-610D(R) back into the downlink communications signals 606D(1)-606D(R) which are then converted into a plurality of downlink RF communications signals and provided to antennas 616(1)-616(S) in the remote units 614(1)-614(S) to client devices in the reception range of the antennas 616(1)-616(S).

The remote units 614(1)-614(S) receive a plurality of uplink RF communications signals from the client devices through the antennas 616(1)-616(S). The remote units 614(1)-614(S) convert the uplink RF communications signals into a plurality of uplink communications signals 618U(1)-618U(S). Remote unit E/O converters are also provided in the remote units 614(1)-614(S) to convert the uplink communications signals 618U(1)-618U(S) into a plurality of uplink optical fiber-based communications signals 610U(1)-610U(S). The remote units 614(1)-614(S) communicate the uplink optical fiber-based communications signals 610U(1)-610U(S) over an uplink optical fiber-based communications medium 612U to the OIMs 608(1)-608(N) in the central unit 604. The OIMs 608(1)-608(N) include O/E converters that convert the received uplink optical fiber-based communications signals 610U(1)-610U(S) into a plurality of uplink communications signals 620U(1)-620U(S) which are processed by the RIMs 602(1)-602(M) and provided as the uplink communications signals 620U(1)-620U(S). The central unit 604 may provide the uplink communications signals 620U(1)-620U(S) to a base station or other communications system.

Note that the downlink optical fiber-based communications medium 612D and the uplink optical fiber-based communications medium 612U connected to each of the remote units 614(1)-614(S) may be a common optical fiber-based communications medium, wherein for example, wave division multiplexing (WDM) is employed to provide the downlink optical fiber-based communications signals 610D(1)-610D(R) and the uplink optical fiber-based communications signals 610U(1)-610U(S) on the same optical fiber-based communications medium.

Figure 7:
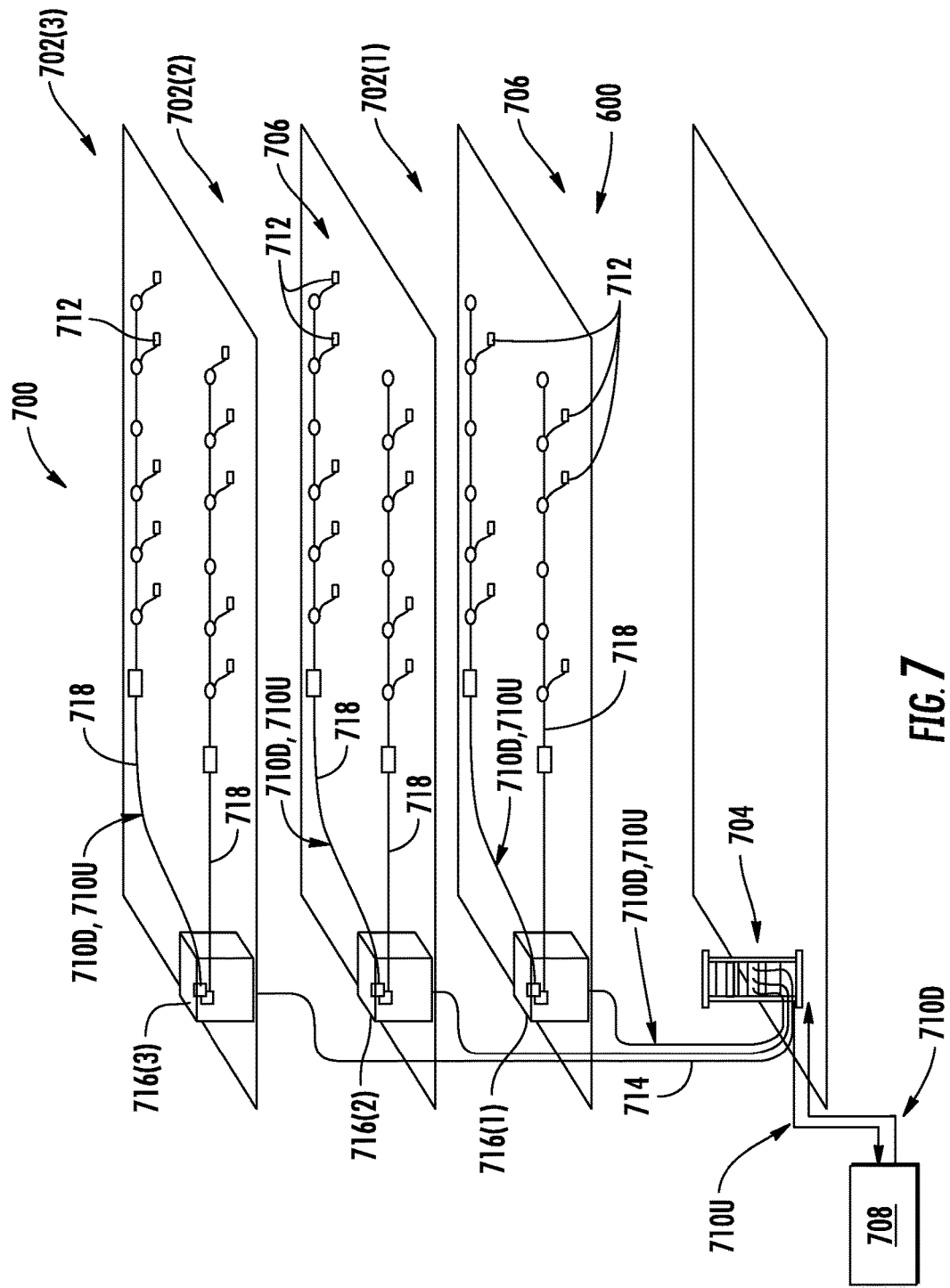
FIG. 7 is a partial schematic cut-away diagram of an exemplary building infrastructure in which a WDS, such as the WDS of FIG. 6, including the remote units of FIG. 3 for supporting cooperative transmission in the WDS of FIG. 3.

The WDS 600 of FIG. 6 may be provided in an indoor environment, as illustrated in FIG. 7. FIG. 7 is a partial schematic cut-away diagram of an exemplary building infrastructure 700 in which a WDS, such as the WDS 600 of FIG. 6, includes the remote units 302(1)-302(N) of FIG. 3 for supporting cooperative transmission in the WDS 300. The building infrastructure 700 in this embodiment includes a first (ground) floor 702(1), a second floor 702(2), and a third floor 702(3). The floors 702(1)-702(3) are serviced by a central unit 704 to provide antenna coverage cells 706 in the building infrastructure 700. The central unit 704 is communicatively coupled to a base station 708 to receive downlink communications signals 710D from the base station 708. The central unit 704 is communicatively coupled to a plurality of remote units 712 to distribute the downlink communications signals 710D to the remote units 712 and to receive uplink communications signals 710U from the remote units 712, as previously discussed above. The downlink communications signals 710D and the uplink communications signals 710U communicated between the central unit 704 and the remote units 712 are carried over a riser cable 714. The riser cable 714 may be routed through interconnect units (ICUs) 716(1)-716(3) dedicated to each of the floors 702(1)-702(3) that route the downlink communications signals 710D and the uplink communications signals 710U to the remote units 712 and also provide power to the remote units 712 via array cables 718.

Figure 8:
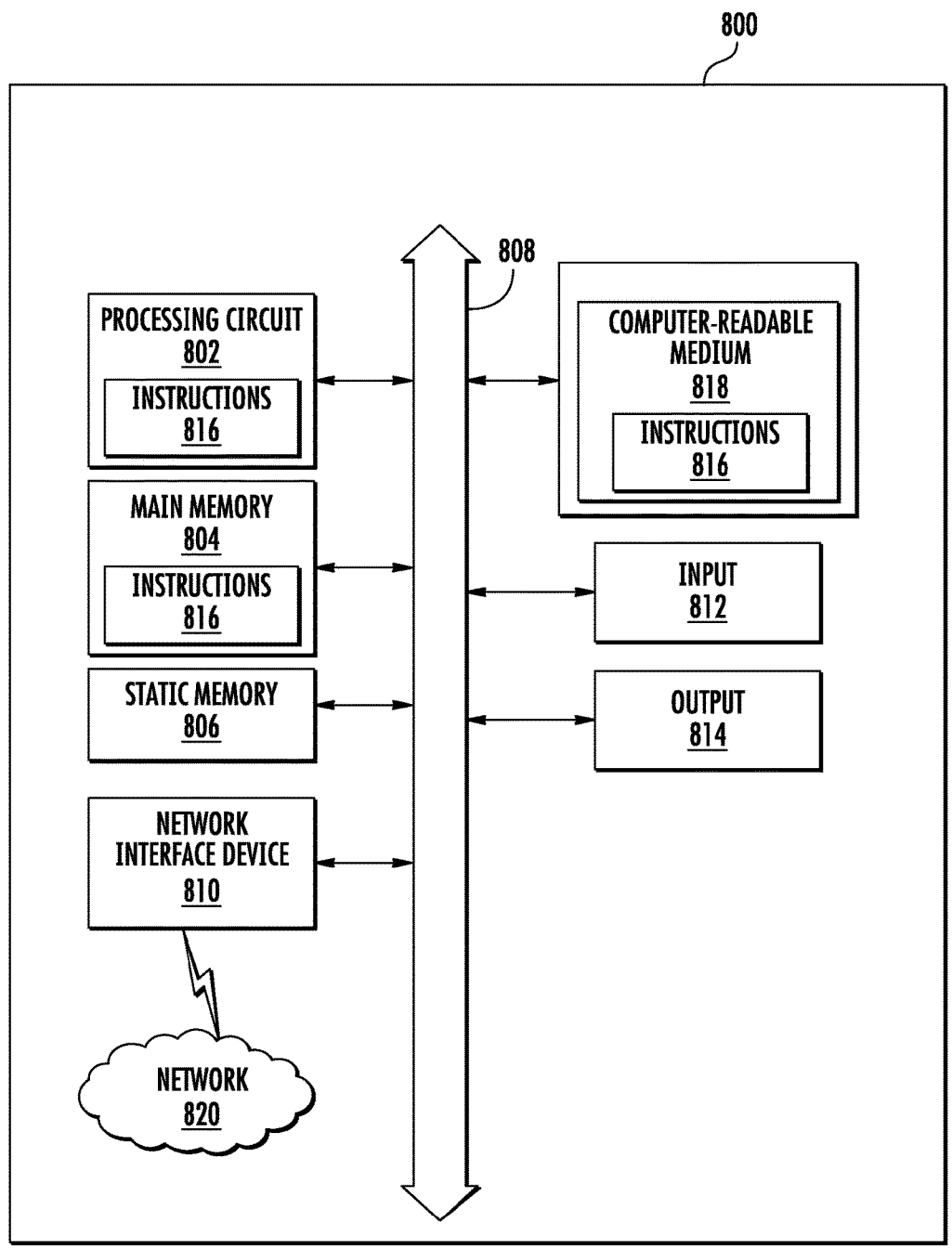
FIG. 8 is a schematic diagram representation of additional detail illustrating an exemplary computer system that could be employed in a controller, such as a control circuit employed by any of the remote units of FIG. 3, for supporting cooperative transmission in the WDS of FIG. 3.

FIG. 8 is a schematic diagram representation of additional detail illustrating an exemplary computer system 800 that could be employed in a controller, such as the control circuit 321 employed by any of the remote units 302(1)-302(N) of FIG. 3, for supporting cooperative transmission in the WDS 300. In this regard, the computer system 800 is adapted to execute instructions from an exemplary computer-readable medium to perform these and/or any of the functions or processing described herein.

In this regard, the computer system 800 in FIG. 8 may include a set of instructions that may be executed to predict frequency interference to avoid or reduce interference in a multi-frequency distributed antenna system (DAS). The computer system 800 may be connected (e.g., networked) to other machines in a local area network (LAN), an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 800 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 800 in this embodiment includes a processing circuit or processor 802, a main memory 804 (e.g., read-only memory (ROM), flash memory, dynamic random access memory (DRAM), such as synchronous DRAM (SDRAM), etc.), and a static memory 806 (e.g., flash memory, static random access memory (SRAM), etc.), which may communicate with each other via a data bus 808. Alternatively, the processor 802 may be connected to the main memory 804 and/or the static memory 806 directly or via some other connectivity means. The processor 802 may be a controller, and the main memory 804 or the static memory 806 may be any type of memory.

The processor 802 represents one or more general-purpose processing devices, such as a microprocessor, central processing unit, or the like. More particularly, the processor 802 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 802 is configured to execute processing logic in instructions for performing the operations and steps discussed herein.

The computer system 800 may further include a network interface device 810. The computer system 800 also may or may not include an input 812, configured to receive input and selections to be communicated to the computer system 800 when executing instructions. The computer system 800 also may or may not include an output 814, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 800 may or may not include a data storage device that includes instructions 816 stored in a computer-readable medium 818. The instructions 816 may also reside, completely or at least partially, within the main memory 804 and/or within the processor 802 during execution thereof by the computer system 800, the main memory 804 and the processor 802 also constituting a computer-readable medium. The instructions 816 may further be transmitted or received over a network 820 via the network interface device 810.

While the computer-readable medium 818 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A wireless distribution system (WDS), comprising:
a plurality of remote units each configured to define a home coverage cell among a plurality of coverage cells in the WDS to communicate one or more downlink signals to one or more client devices located within a boundary of the home coverage cell; and
wherein a selected remote unit among the plurality of remote units is configured to:
identify at least one selected client device located in at least one overlapping coverage area between the home coverage cell of the selected remote unit and at least one neighboring coverage cell defined by at least one neighboring remote unit among the plurality of remote units;
receive channel-data information from the at least one selected client device;
form a first radio frequency (RF) beam based on the channel-data information to distribute at least one first downlink signal among the one or more downlink signals to the at least one selected client device; and
coordinate with the at least one neighboring remote unit based on the channel-data information to form at least one second RF beam having an identical number of RF carriers and an identical number of symbol streams as the first RF beam to distribute the at least one first downlink signal from the at least one neighboring remote unit to the at least one selected client device.

2. The WDS of claim 1, wherein the selected remote unit and the at least one neighboring remote unit are configured to form the respective first RF beam and the at least one second RF beam based on a defined time-frequency resource.

3. The WDS of claim 2, wherein the selected remote unit and the at least one neighboring remote unit are each configured to pre-code the first downlink signal based on the channel-data information to provide phase coherency between the at least one first RF beam and the at least one second RF beam.

4. The WDS of claim 2, wherein the selected remote unit is further configured to receive the channel-data information based on at least one channel state information (CSI) provided by the at least one selected client device.

5. The WDS of claim 2, wherein the selected remote unit is further configured to:
identify at least one second selected client device located within the boundary of the home coverage cell of the selected remote unit and outside the at least one overlapping coverage area; and
distribute at least one second downlink signal among the one or more downlink signals to the at least one second selected client device.

6. The WDS of claim 5, wherein the selected remote unit is further configured to distribute the at least one first downlink signal and the at least one second downlink signal.

7. The WDS of claim 5, wherein the selected remote unit is further configured to distribute the at least one second downlink signal based on the defined time-frequency resource.

8. The WDS of claim 7, wherein the defined time-frequency resource comprises the identical number of RF carriers and the identical number of symbol streams.

9. The WDS of claim 5, wherein the selected remote unit is further configured to pre-code the at least one second downlink signal to provide spatial separation from the at least one first downlink signal.

10. The WDS of claim 1, wherein the at least one selected client device is configured to receive the at least one first downlink signal from the selected remote unit and the at least one neighboring remote unit.

11. The WDS of claim 1, further comprising a central unit communicatively coupled to the plurality of remote units over a communications medium, wherein the central unit is configured to:
distribute a plurality of downlink communications signals each comprising the one or more downlink signals to the plurality of remote units over the communications medium; and
receive a plurality of uplink communications signals from the plurality of remote units over the communications medium.

12. The WDS of claim 11, wherein:
the communications medium comprises a downlink optical fiber-based communications medium and an uplink optical fiber-based communications medium;
the central unit comprises electrical-to-optical (E/O) converters configured to generate a plurality of downlink optical fiber-based communications signals based on the plurality of downlink communications signals for distribution to the plurality of remote units;
the plurality of remote units comprises:
remote unit optical-to-electrical (O/E) converters configured to convert the plurality of downlink optical fiber-based communications signals into the plurality of downlink communications signals; and
remote unit E/O converters configured to generate a plurality of uplink optical fiber-based communications signals based on the plurality of uplink communications signals for distribution to the central unit; and
the central unit further comprises O/E converters configured to convert the plurality of uplink optical fiber-based communications signals into the plurality of uplink communications signals.

13. A method for supporting cooperative transmissions among a plurality of remote units in a wireless distribution system (WDS), comprising:
   identifying at least one selected client device located in at least one overlapping coverage area between a home coverage cell of a selected remote unit among the plurality of remote units and at least one neighboring coverage cell defined by at least one neighboring remote unit among the plurality of remote units;
   receiving channel-data information from the at least one selected client device;
   forming a first radio frequency (RF) beam based on the channel-data information to distribute at least one first downlink signal to the at least one selected client device; and
   coordinating with the at least one neighboring remote unit based on the channel-data information to form at least one second RF beam having an identical number of RF carriers and an identical number of symbol streams as the first RF beam to distribute the at least one first downlink signal from the at least one neighboring remote unit to the at least one selected client device.

14. The method of claim 13, further comprising forming the respective first RF beam and the at least one second RF beam based on a defined time-frequency resource.

15. The method of claim 14, further comprising precoding the at least one first downlink signal based on the channel-data information to provide phase coherency between the first RF beam and the at least one second RF beam.

16. The method of claim 14, further comprising receiving the channel-data information based on at least one channel state information (CSI) provided by the at least one selected client device.

17. The method of claim 14, further comprising:
   identifying at least one second selected client device located within a boundary of the home coverage cell of the selected remote unit and outside the at least one overlapping coverage area; and
   distributing at least one second downlink signal to the at least one second selected client device.

18. The method of claim 17, further comprising distributing the at least one first downlink signal and the at least one second downlink signal.

19. The method of claim 17, further comprising distributing the at least one second downlink signal based on the defined time-frequency resource.

20. The method of claim 17, further comprising precoding the at least one second downlink signal to provide spatial separation from the at least one first downlink signal.

* * * * *